United States Patent [19]
Jackson et al.

[11] Patent Number: 6,010,271
[45] Date of Patent: *Jan. 4, 2000

[54] JOINT ASSEMBLY

[75] Inventors: Raymond W. Jackson, Ontario, Canada; Donald E. Szczesny, Sterling Heights, Mich.

[73] Assignee: TRW Inc., Lyndhurst, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/595,492

[22] Filed: Feb. 1, 1996

[51] Int. Cl.$^7$ ........................................ F16C 11/00
[52] U.S. Cl. .......................... 403/131; 403/132; 403/133; 403/144
[58] Field of Search .................................. 403/122, 132, 403/133, 135, 137, 138, 140, 144; 29/898.044, 898.047, 441.1, 525; 384/208, 209

[56] References Cited

U.S. PATENT DOCUMENTS

| | | | |
|---|---|---|---|
| 2,878,046 | 3/1959 | Latzen | 287/87 X |
| 3,218,383 | 11/1965 | White | 264/130 X |
| 3,626,566 | 12/1971 | Kilgour | 29/149.5 B X |
| 3,656,221 | 4/1972 | Scheublein, Jr. et al. | |
| 3,904,300 | 9/1975 | Hetmann | 403/132 X |
| 4,003,667 | 1/1977 | Gaines et al. | 403/132 X |
| 4,353,660 | 10/1982 | Parks | 403/132 |
| 4,355,543 | 10/1982 | Ikemoto et al. | 403/133 X |
| 4,504,166 | 3/1985 | Morin | |
| 4,639,159 | 1/1987 | Amrath | |
| 4,875,794 | 10/1989 | Kern, Jr. | 403/132 |
| 5,011,321 | 4/1991 | Kidokoro | |
| 5,066,159 | 11/1991 | Urbach | |
| 5,066,160 | 11/1991 | Wood | |
| 5,154,530 | 10/1992 | Dresselhouse | |
| 5,188,477 | 2/1993 | Idosako et al. | |
| 5,284,398 | 2/1994 | Sakai | 403/135 |
| 5,286,131 | 2/1994 | Wood | |
| 5,395,176 | 3/1995 | Zivkovic | |
| 5,464,296 | 11/1995 | Broszat | 403/138 |
| 5,496,125 | 3/1996 | Maughan | 403/133 X |
| 5,551,791 | 9/1996 | Schneider | 403/138 X |
| 5,564,853 | 10/1996 | Maughan | 403/137 |
| 5,597,258 | 1/1997 | Kincaid et al. | 403/144 |
| 5,655,848 | 8/1997 | Catron | 403/137 |
| 5,672,023 | 9/1997 | Lieber et al. | 403/135 X |
| 5,772,337 | 6/1998 | Maughan et al. | 403/137 X |
| 5,772,352 | 6/1998 | Fukumoto et al. | 403/144 |

FOREIGN PATENT DOCUMENTS

| | | | |
|---|---|---|---|
| 891643 | 10/1953 | Germany | 403/138 |

*Primary Examiner*—Daniel P. Stodola
*Assistant Examiner*—Burce A. Lev
*Attorney, Agent, or Firm*—Tarolli, Sundheim, Covell, Tummino & Szabo L.L.P.

[57] ABSTRACT

A joint assembly (10) includes a metal housing which encloses a head end portion (24) of a movable stud member (22). A metal outer (30) bearing engages the head end portion (24) of the stud member (22). The outer bearing (30) has a cylindrical outer side surface (44) with a diameter which is larger than a diameter of a cylindrical inner side surface (42) of a chamber (18) in the housing (12). The outer bearing (30) is retained against movement relative to the housing (12) by an interference fit. During fabrication of the joint assembly (10), a spring (34) and inner bearing (32) are inserted into the housing (12). An interference fit is established between the outer bearing (30) and the housing (12) by sliding the cylindrical outer side surface (44) of the outer bearing along the cylindrical inner side surface (42) of the chamber (18) in the housing. A rim portion (58) of the housing is then deformed or swaged over the outer bearing (30) to form a lip (64) which further retains the outer bearing in the housing.

1 Claim, 3 Drawing Sheets

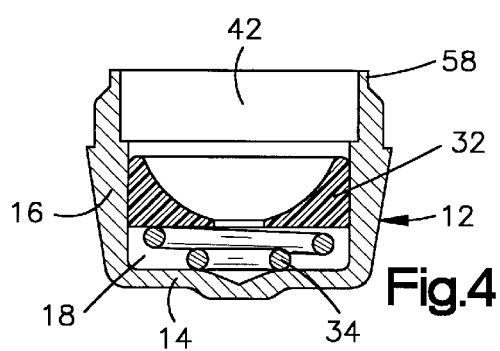
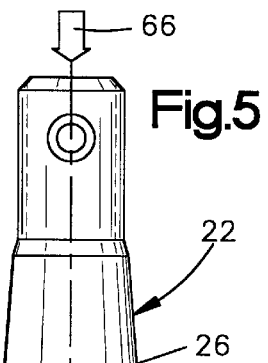
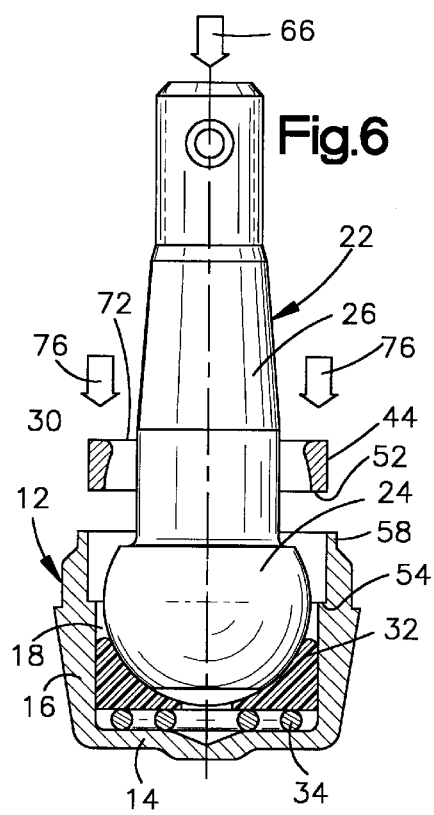
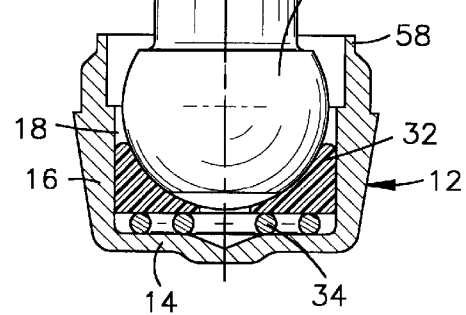
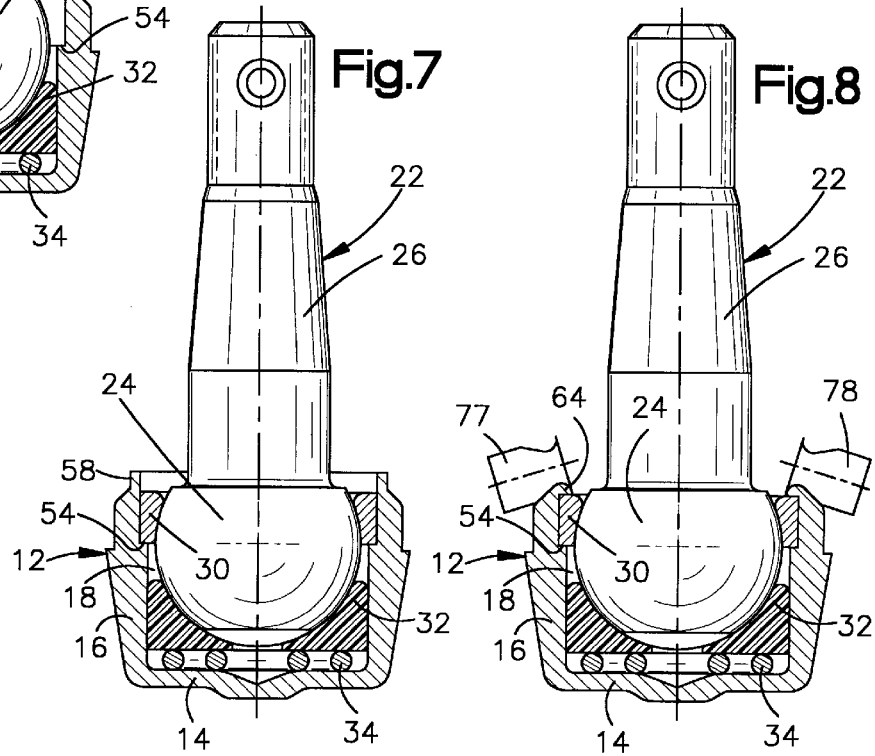

JOINT ASSEMBLY

BACKGROUND OF THE INVENTION

The present invention relates to a joint assembly and more specifically to a joint assembly having a housing which encloses a bearing disposed in engagement with a portion of a movable member.

A known joint assembly includes a generally cylindrical metal housing which encloses a ball end portion of a movable stud member. The housing has an opening at one end through which a shank portion of the stud member extends. An opening at the opposite end of the housing is closed by a plug.

An upper bearing is disposed adjacent to the opening through which the shank portion of the stud member extends. The upper bearing engages the ball end portion of the stud member. A lower bearing engages the ball end portion of the stud member at a location opposite from the shank portion of the stud member. A coil spring is pressed against the lower bearing by the plug which closes the housing. A boot seal extends between the shank portion of the stud member and the housing.

A joint assembly having this construction requires machining of the housing at opposite ends, that is, at the end of the housing through which the shank portion of the stud member extends and the open end of the housing which is closed by the plug. During fabrication of the joint assembly, the upper bearing, stud member, lower bearing, spring and plug are sequentially inserted through the open end of the housing. The boot seal is installed around the shank portion of the stud member and engages the other end of the housing. Since machining and assembly operations are performed at both ends of the housing, there is a substantial amount of handling of the housing and other components of the joint assembly during fabrication of the joint assembly.

In addition, the housing must have adequate material to support the upper bearing to prevent stud pull out from one end of the housing. Adequate material must also be provided at the opposite end of the housing to enable the plug to be enclosed by the housing. This results in a relatively large housing which adds to the cost of raw materials for the joint assembly. In addition, clearance must be designed in a vehicle to accommodate a relatively tall housing profile.

SUMMARY OF THE INVENTION

An improved joint assembly includes a metal housing which at least partially encloses a portion of a movable member. A metal bearing is enclosed by the housing and is disposed in engagement with the movable member. The bearing is retained against movement relative to the housing by an interference fit between an outer side surface of the bearing and an inner side surface of the metal housing.

During fabrication of the joint assembly, a spring and an inner bearing are positioned in a chamber in the metal housing. A portion of the movable member is inserted into the chamber in the housing. The spring is compressed against an end wall of the housing under the influence of force transmitted from the movable member through the inner bearing to the spring. The metal outer bearing is also inserted into the housing. The outer bearing is connected with the housing by an interference fit between the outer bearing and the housing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is an illustration depicting the manner in which an inner bearing and spring are positioned in the housing during fabrication of the joint assembly;

FIG. 5 is an illustration depicting the manner in which the head end portion of the stud member is pressed against the inner bearing to compress the spring against the housing during fabrication of the joint assembly;

FIG. 6 is an illustration depicting the manner in which the outer bearing is moved into the housing during fabrication of the joint assembly;

FIG. 7 is a schematic illustration depicting the relationship between the stud member, inner and outer bearings and housing after the outer bearing has been inserted into the housing during fabrication of the joint assembly; and FIG. 8 is a schematic illustration depicting the manner in which a portion of the housing is swaged over the outer bearing during fabrication of the joint assembly.

DESCRIPTION OF PREFERRED EMBODIMENT

Figure 1:
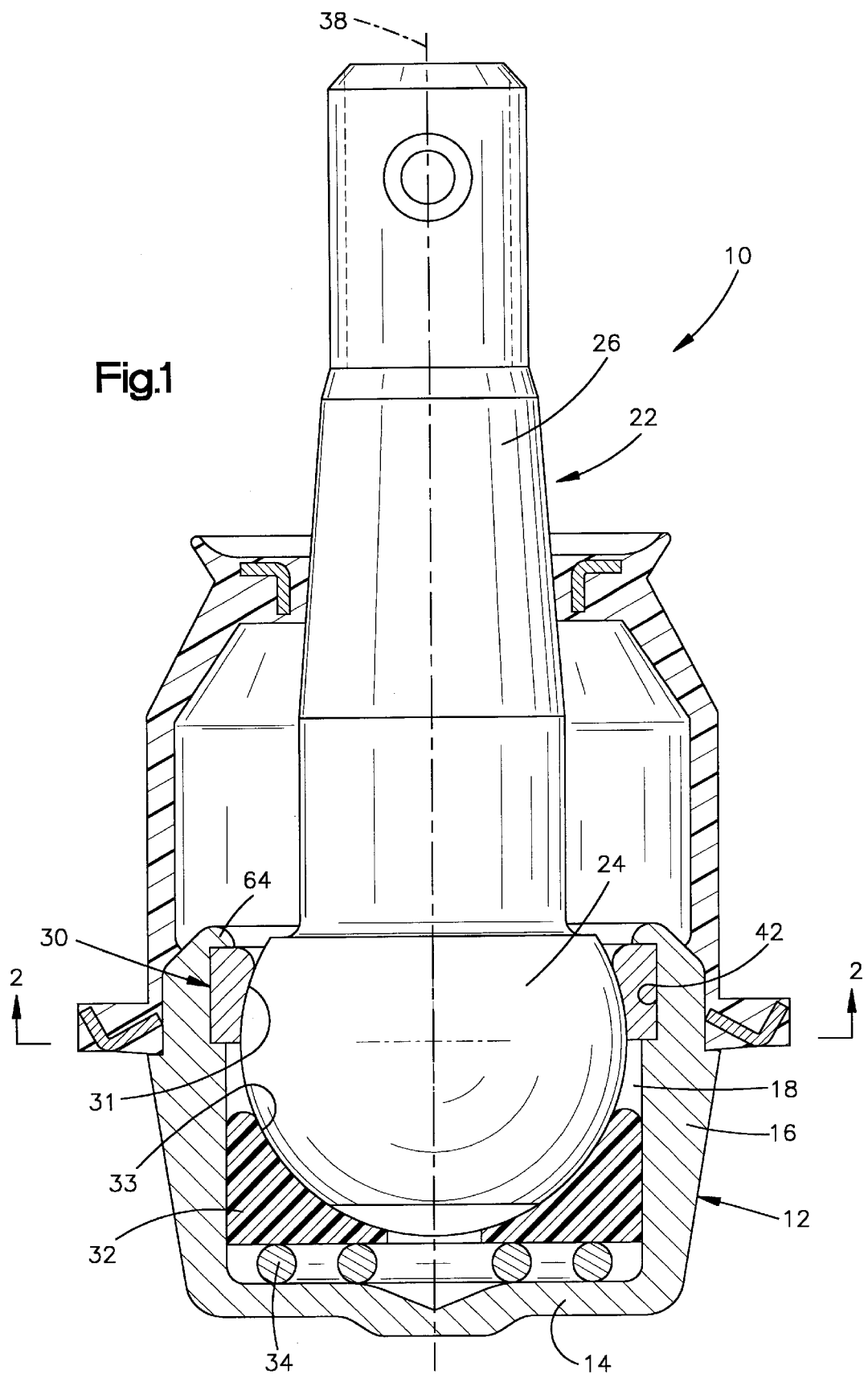
FIG. 1 is a sectional view of a joint assembly constructed in accordance with the present invention.

A ball joint assembly 10 constructed in accordance with the present invention is illustrated in FIG. 1. The ball joint assembly 10 includes a one-piece cast metal housing 12. The housing 12 has a circular end wall 14 and a generally cylindrical side wall 16 which cooperate to define a generally cylindrical socket chamber 18.

A movable stud member 22 has a ball end portion 24 which is disposed in the socket chamber 18. The ball end portion 24 of the stud member 22 is formed as a portion of a sphere. A generally cylindrical shank portion 26 extends axially outward from the ball end portion 24. In the illustrated embodiment of the invention, the shank portion 26 and ball end portion 24 of the stud member 22 are forged as one piece of metal. However, the ball end portion 24 of the stud member 22 could have any one of many different known constructions and configurations if desired.

An annular metal outer bearing 30 is disposed in the socket chamber 18. The outer bearing 30 has an inner side surface 31 which is formed as a portion of a sphere and is disposed in engagement with the ball end portion 24 of the stud member 22. A polymeric inner bearing 32 is disposed in the socket chamber 18 between the outer bearing 30 and the circular end wall 14 of the housing 12. The inner bearing 32 has an inner side surface 33 which is formed as a portion of a sphere and is disposed in engagement with the ball end portion 24 of the stud member 22.

A metal spiral coil spring 34 is compressed against the circular end wall 14 of the housing 12 by the inner bearing 32. The coil spring 34 presses the inner bearing 32 against the ball end portion 24 of the movable stud member 22 with a force of approximately 200 pounds. This force presses the ball end portion 24 of the stud member 22 against the outer bearing 30.

The outer bearing 30 and the housing 12 are both formed of metal, in the illustrated embodiment of the invention, steel. The inner bearing 32 is formed of a suitable polymeric material. Thus, the inner bearing 32 may be molded as one piece of Nylon or Delrin (trademark) type polymeric material.

The outer and inner bearings 30 and 32 cooperate to support the stud member 22 for universal sidewise tilting movement from the illustrated upright or initial position shown in FIG. 1. In addition, the bearings 30 and 32 support the stud member 22 for rotational movement about a longitudinal central axis of the shank portion 26 of the stud member. When the stud member 22 is in the initial position shown in FIG. 1, the central axis of the shank portion 26 of the stud member is coincident with a central axis 38 of the joint assembly 10.

Figure 2:
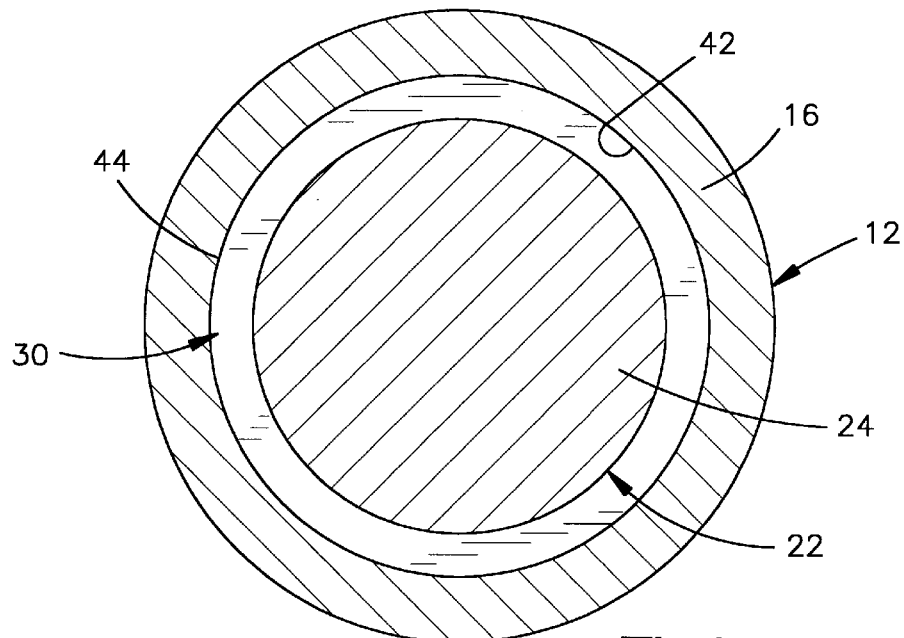
FIG. 2 is a sectional view, taken generally along the line 2—2 of FIG. 1, illustrating the relationship of a head end portion of a movable stud member to an outer bearing and housing of the joint assembly.
Figure 3:
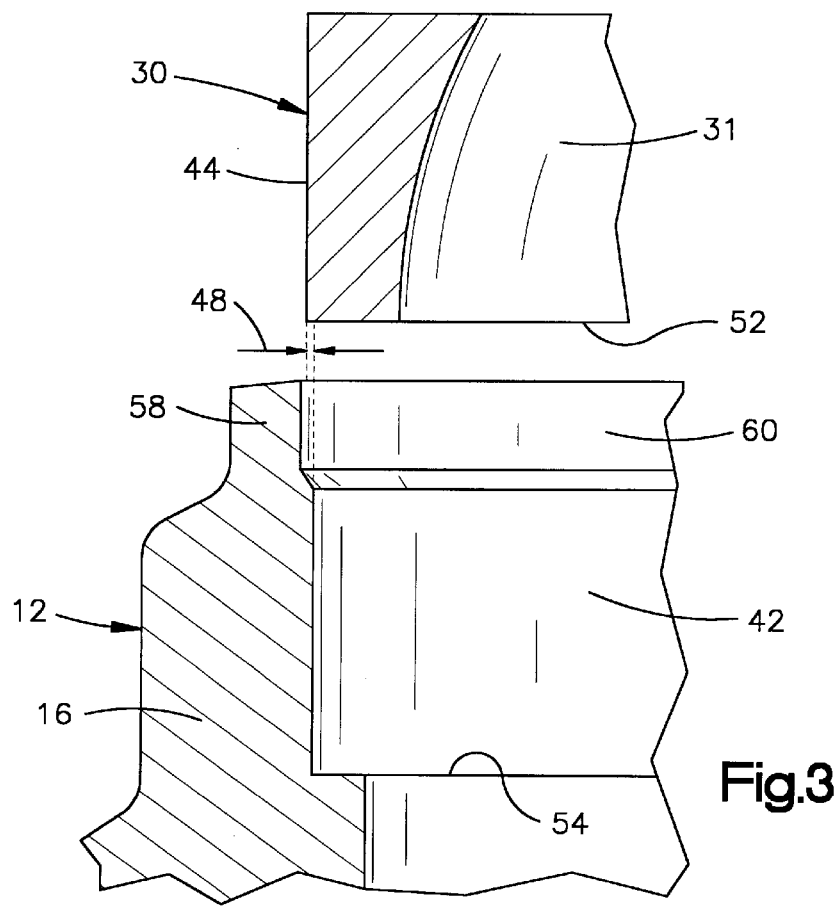
FIG. 3 is an enlarged fragmentary view illustrating a dimensional relationship which enables an interference fit to be obtained between the outer bearing and housing of the joint assembly.

In accordance with one of the features of the present invention, there is an interference fit between the metal outer bearing 30 and the metal side wall 16 of the housing 12. The side wall 16 of the housing 12 has a continuous cylindrical inner side surface 42 (FIGS. 2 and 3). The outer bearing 30 has a continuous cylindrical outer side surface 44.

The cylindrical outer side surface 44 of the bearing 30 is slightly larger than the cylindrical inner side surface 42 of the housing 12. Thus, a radius of the cylindrical outer side surface 44 of the bearing 30 exceeds a radius of the cylindrical inner side surface 42 of the housing 12 by an amount indicated at 48 in FIG. 3. The amount 48 by which the radius of the cylindrical outer side surface 44 of the outer bearing 30 exceeds the radius of the cylindrical inner side surface 42 of the housing 12 is relatively small, for example, approximately 0.0005 to 0.001 inches.

The cylindrical outer side surface 44 (FIG. 3) of the outer bearing 30 has the same diameter throughout its axial extent. The cylindrical inner side surface 42 of the housing 12 has the same diameter throughout its axial extent. Therefore, there is a uniform metal-to-metal interference fit between the outer bearing 30 and the housing 12 throughout the axial extent of the outer bearing. The outer bearing 30 has a flat annular end surface 52 which abuttingly engages a flat annular inner side surface 54 on the housing 12.

Prior to insertion of the outer bearing 30 into the housing 12, the housing has an upright cylindrical rim 58 (FIG. 3). The rim 58 has a cylindrical inner side surface 60 which is coaxial with the cylindrical inner side surface 42 of the housing 12. However, the cylindrical inner side surface 60 has a larger diameter than the cylindrical inner side surface 42 of the housing 12. The rim 58 is deformed radially inward to form an annular lip 64 (FIG. 1) which overlies the outer bearing 30 and assists the interference fit in retaining the outer bearing in the housing 12.

During manufacture of the ball joint assembly 10, the coil spring 34 is positioned in the socket chamber 18 against the end wall 14 of the housing 12 (FIG. 4). The inner bearing 32 is positioned in the socket chamber 18 in engagement with the coil spring 34. At this time, the coil spring 34 is in the extended condition illustrated in FIG. 4. The extended coil spring 34 holds the inner bearing 32 upward (as viewed in FIG. 4) from the end wall 14 of the housing 12.

The ball end portion 24 of the stud member 22 is then pressed against the inner bearing 32 with a force indicated schematically by an arrow 66 in FIG. 5. The force 66 applied against the bearing 32 by the ball end portion 24 of the stud member 22 is transmitted through the inner bearing 32 to the coil spring 34. The force 66 exceeds 200 pounds and is sufficient to compress the coil spring 34 from the extended condition of FIG. 4 to the flattened condition of FIG. 5.

The outer bearing 30 is then moved axially along the shank portion 26 of the stud member 22 toward the housing 12 (FIG. 6). At this time, the shank portion 26 of the movable stud member 22 extends through a circular central opening 72 in the annular outer bearing 30. As the outer bearing 30 is moved into the housing 12, the relatively large diameter outer side surface 44 of the outer bearing moves into engagement with the relatively small diameter cylindrical inner side surface 42 of the housing.

An axial force, indicated schematically at 76 in FIG. 6, is then applied against the upper (as viewed in FIG. 6) end of the outer bearing to press the outer bearing 30 into the socket chamber 18 in the housing 12. The axial force 76 slides the larger diameter outer side surface 44 of the outer bearing 30 along the smaller diameter inner side surface 42 of the housing 12. As this occurs, a metal-to-metal interference fit is established between the cylindrical inner side surface 42 of the housing 12 and the cylindrical outer side surface 44 of the bearing 30.

As the outer bearing 30 is forced into the housing 12, compressive hoop stresses are set up in the bearing 30 and tend to decrease the diameter of the cylindrical outer side surface 44 of the bearing. At the same time, tensile hoop stresses are set up in the side wall 16 of the housing 12 and tend to increase the diameter of the cylindrical inner side surface 42 of the housing. The outer bearing 30 is forced axially into the housing until the leading end surface 52 (FIG. 3) on the outer bearing 30 moves into engagement with the flat annular inner side surface 54 on the housing 12. Thus, the axial forces applied against the bearing 30 move the bearing into the housing 12 from the position shown in FIG. 6 to the position shown in FIG. 7.

Once the outer bearing 30 has been pressed into the housing 12 (FIG. 7), the interference fit between the outer bearing 30 and the housing 12 retains the outer bearing against movement relative to the housing. Therefore, the outer bearing 30 holds the stud member 22 against axial movement when the force 66 (FIG. 6) is removed from the stud member. The force transmitted from the compressed spring 34 through the inner bearing 32 to the ball end portion 24 of the stud member 22 presses the ball end portion of the stud member against the outer bearing 30. This results in the stud member 22 being held in the upright orientation of FIG. 7.

While the inner and outer bearings 30 and 32 hold the ball end portion 24 of the stud member 22, the rim 28 is deformed radially inward to overlie the outer bearing 30. Thus, swaging tools 77 and 78 (FIG. 8) are moved around the rim 58 to deflect the rim radially and axially inward to form the annular lip 64. The annular lip 64 overlies the outer bearing 30 and assists the interference fit between the outer bearing 30 and the side wall 16 of the housing 12 in retaining the outer bearing 30 in the socket chamber. The stud member 22 is held in the upright orientation of FIG. 8 during the swaging operation by the compressed spring 34 and outer and inner bearings 30 and 32.

From the above description of the invention, those skilled in the art will perceive improvements, changes and modifications. Such improvements, changes and modifications within the skill of the art are intended to be covered by the appended claims.

Having described the invention, the following is claimed:

1. A method of assembling a joint, said method comprising the steps of:

providing a metal housing having an end wall and a side wall which defines an opening to a chamber in the housing;

placing a coil spring in the chamber in the housing, the coil spring engaging the end wall of the housing;

inserting a first bearing formed of a polymeric material into the chamber in the housing, the first bearing engaging and compressing the coil spring and being urged in an axial direction away from the end wall of the housing by the bias of the coil spring;

providing a movable member having a head end portion in the chamber in the housing and a shank portion extending from the head end portion, the head end portion engaging the first bearing in the chamber and being urged in the axial direction away from the end wall of the housing by the bias of the coil spring acting on the first bearing, the shank portion being at least partially disposed outside of the chamber in the housing;

inserting a second bearing formed of metal in the chamber into the housing and into engagement with the head end portion of the movable member, the second bearing being urged in the axial direction away from the end wall of the housing by the bias of the coil spring acting on the first bearing;

retaining the second bearing and the head end portion of the movable member in the chamber against movement relative to the housing due to the bias of the coil spring by an interference fit between a cylindrical outer side surface of the second bearing and a cylindrical inner side surface of the housing, the interference fit being sufficient to hold the coil spring in a compressed condition against the bias of the coil spring; and thereafter, deforming a rim portion of the housing surrounding the opening radially inward into engagement with the second bearing to form an annular lip which overlies the second bearing and assists the interference fit in retaining the second bearing in the housing.

* * * * *